United States Patent
Ruse et al.

(10) Patent No.: US 7,419,273 B1
(45) Date of Patent: Sep. 2, 2008

(54) MIRROR WITH BASE BRACKET HAVING INTEGRALLY-MOLDED REINFORCEMENT

(75) Inventors: James A. Ruse, Allegan, MI (US); Keith D. Foote, Kentwood, MI (US); Kenneth C. Peterson, Comstock Park, MI (US)

(73) Assignee: Magna Donnelly Mirrors North America, LLC, Kentwood, MI (US)

( * ) Notice: Subject to any disclaimer, the term of this patent is extended or adjusted under 35 U.S.C. 154(b) by 248 days.

(21) Appl. No.: 10/710,941

(22) Filed: Aug. 13, 2004

Related U.S. Application Data

(60) Provisional application No. 60/481,237, filed on Aug. 15, 2003.

(51) Int. Cl.
G02B 7/182 (2006.01)
B60R 1/06 (2006.01)

(52) U.S. Cl. .................... 359/841; 359/872; 248/475.1; 248/479

(58) Field of Classification Search ................. 359/841, 359/872, 877; 248/475.1, 476, 477, 479
See application file for complete search history.

(56) References Cited

U.S. PATENT DOCUMENTS

| | | | |
|---|---|---|---|
| 4,789,232 A * | 12/1988 | Urbanek | 248/549 |
| 5,005,797 A * | 4/1991 | Maekawa et al. | 248/479 |
| 5,639,054 A * | 6/1997 | Gerndt et al. | 248/478 |
| 5,684,646 A | 11/1997 | Boddy | |
| 5,703,732 A | 12/1997 | Boddy et al. | |
| 5,903,402 A * | 5/1999 | Hoek | 359/841 |
| 6,109,586 A * | 8/2000 | Hoek | 248/476 |
| 6,116,743 A * | 9/2000 | Hoek | 359/871 |
| 6,382,805 B1 * | 5/2002 | Miyabukuro | 359/872 |
| 6,416,191 B1 * | 7/2002 | Lang et al. | 359/841 |
| 6,416,192 B2 | 7/2002 | Horne et al. | |
| 6,592,231 B2 | 7/2003 | Horne et al. | |
| 6,672,726 B1 * | 1/2004 | Boddy et al. | 359/841 |
| 6,877,867 B1 * | 4/2005 | Murakami | 359/841 |
| 7,036,945 B2 * | 5/2006 | Sakata | 359/841 |
| 2002/0075577 A1 * | 6/2002 | Hattori et al. | 359/841 |

* cited by examiner

*Primary Examiner*—Ricky D Shafer
(74) *Attorney, Agent, or Firm*—McGarry Bair PC

(57) ABSTRACT

A pivoting exterior rearview mirror assembly comprises a mirror housing, a base, a support frame, a pivot assembly, and associated elements comprised primarily of a plastic or polymeric material. The pivot assembly is provided with a pivot reinforcement made of a relatively high-strength material, such as steel. The base is provided with a cantilever reinforcement made of a relatively high-strength material, such as steel. The reinforcing steel increases the load carrying capability of the plastic and reduces the potential material failure of unreinforced plastic.

15 Claims, 8 Drawing Sheets

MIRROR WITH BASE BRACKET HAVING INTEGRALLY-MOLDED REINFORCEMENT

CROSS-REFERENCE TO RELATED APPLICATIONS

This application claims the benefit of U.S. provisional application Ser. No. 60/481,237, filed Aug. 15, 2003, which is incorporated herein in its entirety.

FIELD OF THE INVENTION

The invention relates generally to exterior rearview mirrors for motor vehicles, and in particular to a pivotable cantilevered rearview mirror having reinforcing elements integrated into the pivot mechanism and cantilever arm.

DESCRIPTION OF THE RELATED ART

External mirrors are ubiquitous for contemporary vehicles and have long been used to aid the driver in operating the vehicle, especially in improving the rearward view of the driver. Over time, more and more functionality has been incorporated into the external mirrors. For example, it is common to pivot or fold the external mirror against the vehicle body and prevent the jarring of the mirror when the vehicle is not operated. The mirror-folding function can incorporate a power assist, such as that disclosed in U.S. Pat. Nos. 5,684,646 and 5,703,732, which are incorporated herein by reference.

Mirrors can be heavy, particularly larger mirrors used on pickup trucks and sport utility vehicles (SUVs), and mirrors incorporating enhanced functionality requiring additional electrical and/or mechanical components. At the same time, fuel economy considerations dictate that the mirror be as light as practical. This has led to an increased use of high-strength plastics for the various structural and operational elements comprising the mirror assembly. However, plastics cannot readily be used for certain structural elements due to unsatisfactory strength and/or performance characteristics, such as vibration resonance.

SUMMARY OF THE INVENTION

The invention relates to an exterior vehicle mirror system comprises a base having a mounting portion for mounting the mirror system to a vehicle, a reflective element assembly for providing an operator of the vehicle with a rearward view, a connection pivotally mounting the reflective element assembly to the base, and a reinforcing element aligned with the connection to distribute at least one of stresses and forces imposed on the vehicle mirror system to the base bracket along a stress path to enhance the strength of the connection. A reinforcing element is integrally molded with at least one of the base and the reflective element assembly in cooperative relationship with the connection. The reinforcing element is made of a material having a higher strength-to-weight ratio than the material comprising at least one of the base and the reflective element. The reinforcing element surrounds at least a portion of the connection.

The reinforcing element further comprises a surface, and the surface is in abutment with the base to resist deflection of the base due to forces imposed on the reflective element assembly. The reinforcing element comprises a first reinforcing element associated with the base and a second reinforcing element associated with the reflective element assembly. The first reinforcing element is vertically spaced from the second reinforcing element.

The first reinforcing element comprises a plate having a first end positioned beneath the connection and the second reinforcing element, and a second end extending from the first end and in abutment with the mounting portion of the base. The first reinforcing element is L-shaped between the first end and the second end. The L-shape of the first reinforcing element transfers at least one of forces, stresses, and moments within the vehicle mirror system from beneath the connection at the first end to the mounting portion adjacent to the second end thereof.

The reflective element assembly further comprises a recess which receives the second reinforcing element. The recess has a lower surface which forms a portion of the connection, and the second reinforcing element abuts the lower surface. The recess and the second reinforcing element each comprise a coaxially-aligned recess forming a portion of the connection.

The second reinforcing element includes a vertically-extending flange, and the vertically extending flange is in alignment with at least one axis of the reflective element assembly.

The second reinforcing element further comprises an annular portion surrounding the connection. A portion of the annular portion is integrally formed with the vertically-extending flange, whereby the vertically-extending flange is capable of transferring at least one of forces, stresses, and moments through the connection via the annular portion. At least one of the first and second reinforcing elements is made of metal.

DESCRIPTION OF THE PREFERRED EMBODIMENT

Figure 1:
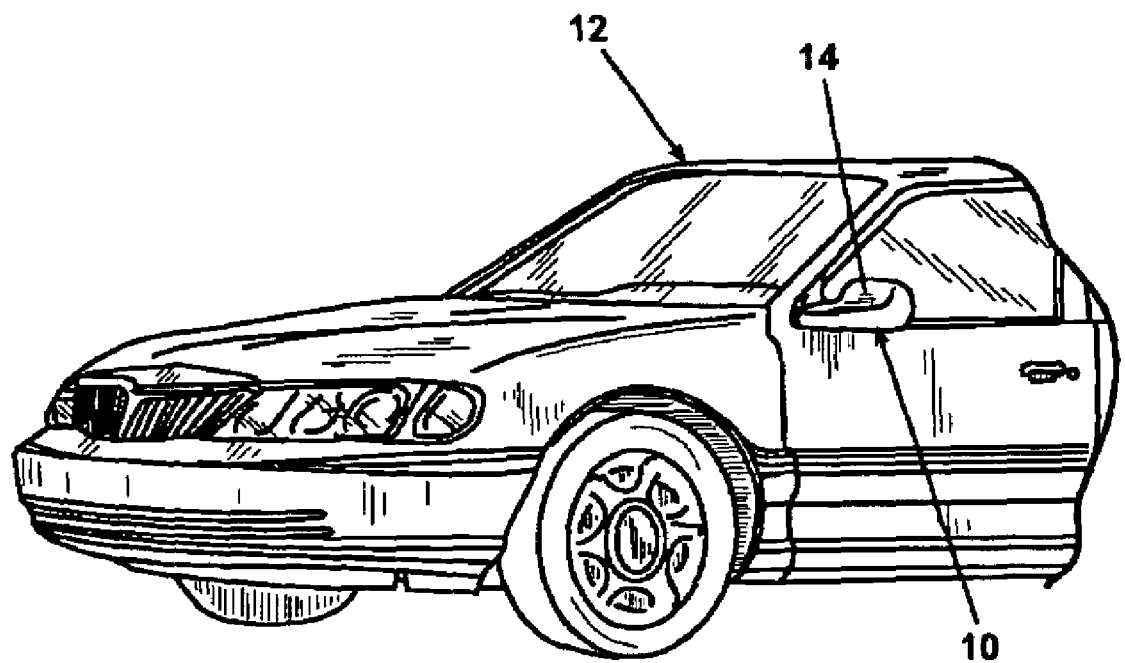
FIG. 1 is a perspective view of a portion of a motor vehicle comprising an exterior rearview mirror assembly according to the invention.
Figure 2:
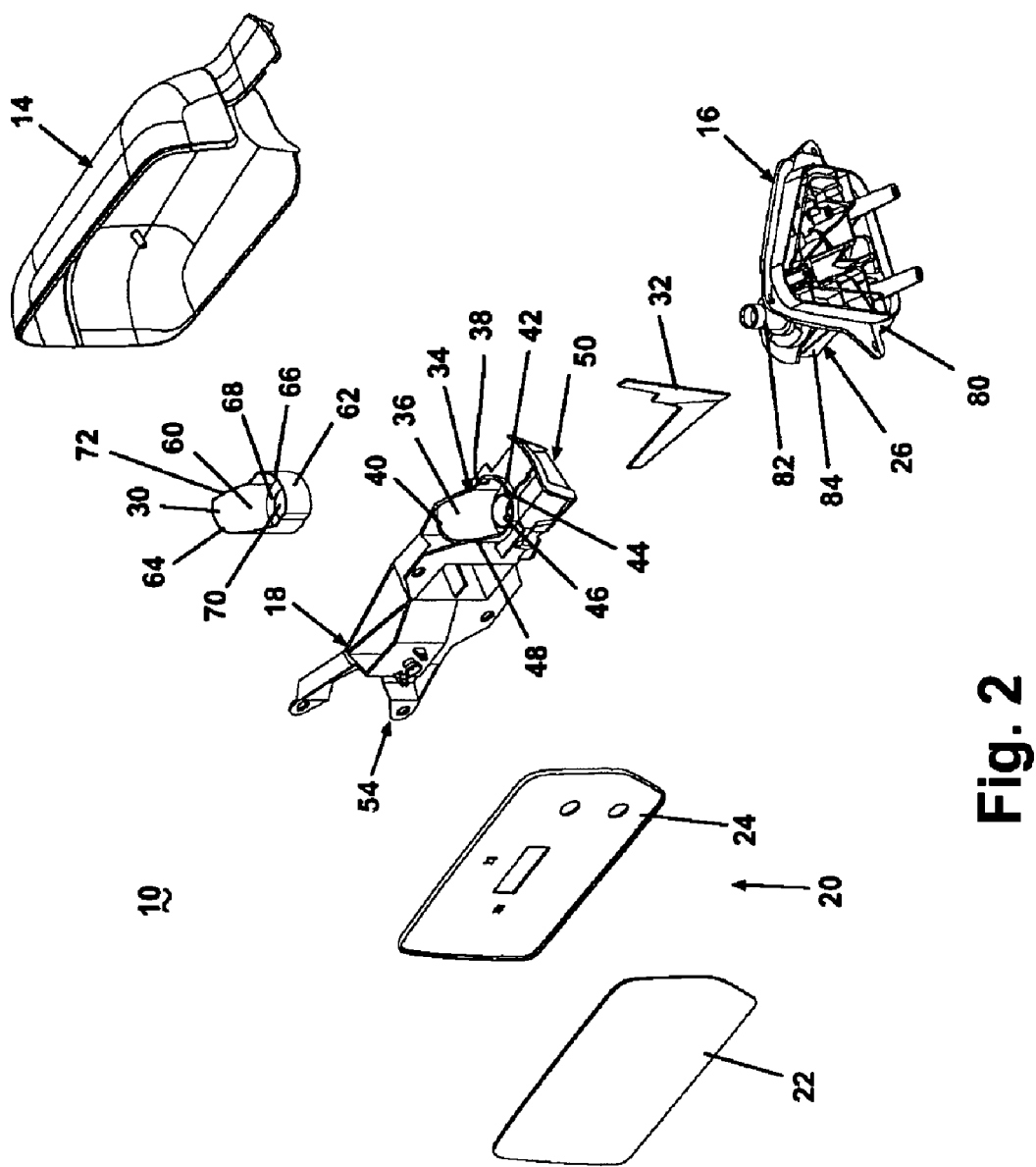
FIG. 2 is an exploded view of the exterior rearview mirror assembly shown in FIG. 1 illustrating a support frame incorporating a reinforcing pivot reinforcement and a base incorporating a cantilever reinforcement.

Referring now to the drawings, and to FIG. 1 in particular, an exterior rearview mirror assembly 10 according to the invention is shown attached to a motor vehicle 12. Referring also to FIG. 2, the mirror assembly 10 comprises a mirror housing 14 enclosing a base 16, a support frame 18, and a reflective element assembly 20. The mirror assembly 10 will be recognized as a generally conventional rearview mirror assembly in many respects, except as otherwise described herein.

The reflective element assembly 20 comprises a well-known reflective element 22 mounted to a well-known glass case 24 and attached to the support frame 18, preferably through a well-known tilt actuator assembly (not shown) enabling the reflective element 22 to be tilted about two orthogonal axes. The base 16 comprises a mounting frame 80 adapted for mounting the base 16 to the motor vehicle 12 in a well-known manner, and a support arm 26 extending outwardly therefrom. The support arm 26 comprises a lower portion of a pivot assembly 28 comprising a pivot post 82 for enabling the support frame 18 to pivot about the pivot post 82 relative to the base 16. The support arm 26 is also provided with a support arm wall 84 extending outwardly from the mounting frame 80 and defining a generally vertical surface of the support arm 26. Preferably, the base 16 is fabricated of a generally rigid, high-strength plastic through a conventional thermoforming process such as injection molding.

The support frame 18 is an irregularly shaped member adapted for pivotable attachment to the support arm 26 and support of the reflective element assembly 20, and having a proximal end 50 and a distal end 54. The distal end 54 is adapted for mounting of the reflective element assembly 20. The proximal end 50 is adapted for pivotable attachment to the support arm 26 and has a recess portion comprising a pivot assembly housing 34 adapted for cooperative register with the pivot post 82. Preferably, the support frame 18 is fabricated of a generally rigid, high-strength plastic through a conventional thermoforming process such as injection molding.

The pivot assembly housing 34 comprises a distal arcuate wall 36 and a proximal arcuate wall 38 defined by the same radius and lying along the same cylindrical surface. The distal arcuate wall 36 terminates in an arcuate distal upper rim 40. The proximal arcuate wall 38 terminates in an arcuate proximal upper rim 42. As shown in FIG. 2, the distal upper rim 40 is spaced away from the proximal upper rim 42 and transitions to the proximal upper rim 42 through an inclined arcuate edge 48 lying along the same cylindrical surface as the arcuate walls 36, 38. The arcuate walls 36, 38 transition to an annular floor 44 extending radially inwardly therefrom and defining a pivot bore 46 extending axially through the annular floor 44 and adapted for slidable and rotational register with the pivot post 82.

A first reinforcing element comprising a pivot reinforcement 30 is an annular body adapted for slidable register with the pivot assembly housing 34. The pivot reinforcement 30 comprises a flange-like distal arcuate wall 60 and a proximal arcuate wall 62 defined by the same radius and lying along the same cylindrical surface. The distal arcuate wall 60 terminates in an arcuate distal upper rim 64. The proximal arcuate wall 62 terminates in an arcuate proximal upper rim 66. As shown in FIG. 2, the distal upper rim 64 is spaced away from the proximal upper rim 66 and transitions to the proximal upper rim 66 through an inclined arcuate edge 72 lying along the same cylindrical surface as the arcuate walls 60, 62. The arcuate walls 60, 62 transition to an annular floor 68 extending radially inwardly therefrom and defining a pivot bore 70 extending axially through the annular floor 68 in cooperative register with the pivot bore 46. The pivot reinforcement 30 is preferably fabricated of a material having a relatively higher strength, and preferably a higher strength-to-weight ratio, than the support frame 18 material, such as steel or aluminum.

Referring now to FIGS. 4-7, the base 16 incorporates a second reinforcing element comprising a cantilever reinforcement 32, preferably integrated into the base 16 during the base 16 fabrication process. The cantilever reinforcement 32 is a generally L-shaped, thin, plate-like member, preferably fabricated of a material having a relatively higher strength, and preferably a higher strength-to-weight ratio, than the base 16 material, such as steel or aluminum. As shown in FIGS. 7A-7C, the cantilever reinforcement 32 comprises a mounting frame leg 90 and a support arm leg 92 extending generally orthogonal from a lower portion thereof. A bend line 94 inclined relative to both the mounting frame leg 90 and the support arm leg 92 separates the mounting frame leg 90 and the support arm leg 92 and defines a line at which the support arm leg 92 is bent relative to the mounting frame leg 90, as shown in FIGS. 7B and 7C.

It will be understood that the particular geometry of the pivot reinforcement 30 and the cantilever reinforcement 32 is not critical to the scope of this invention and varying reinforcement structures and materials can be employed without departing from the scope of this invention. For example, the bend line 94 in the cantilever reinforcement 32 is not critical to the invention as the shape of the reinforcing components 30, 32 would be determined at least in part by the packaging and available space characteristics of a particular vehicular mirror implementation and is not required to have a particular shape to be in accordance with the invention. Further, various additional reinforcing characteristics (such as ribs, beads, etc.) can be provided to the reinforcing components 30, 32 without departing from the scope of the invention as well.

The mounting frame leg 90 comprises a thin section 96 having an upper edge 104 and a thick section 98 having a medial edge 102, the thin section 96 transitioning to the thick section 98 through an inclined edge 106 joining the upper edge 104 and the medial edge 102. The support arm leg 92 has a lateral edge 100 extending from and inclined relative to the medial edge 102.

Figure 4:
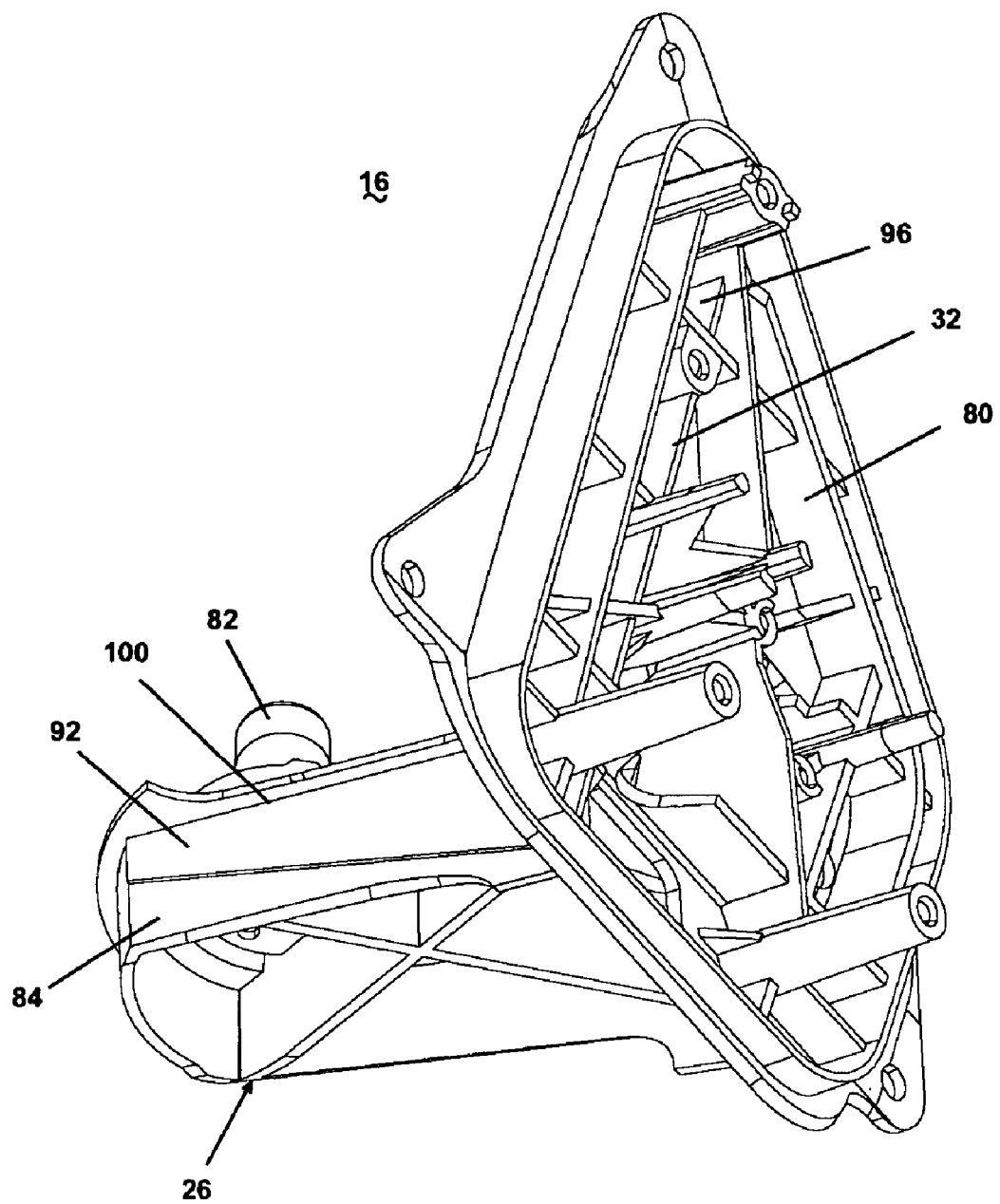
FIG. 4 is a first close up perspective view of the base shown in FIG. 2 illustrating the cantilever reinforcement.
Figure 5:
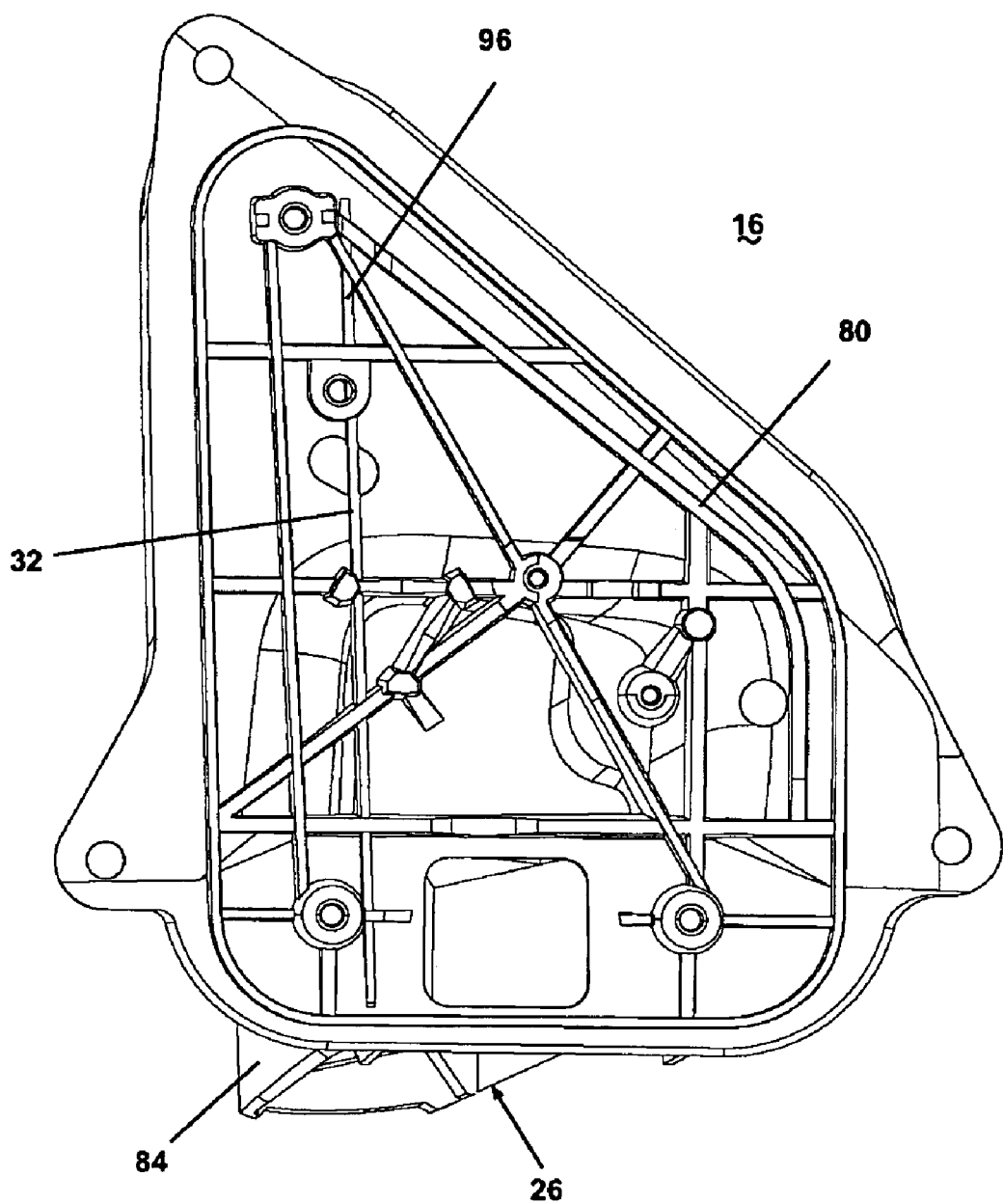
FIG. 5 is a second close up perspective view of the base shown in FIG. 2 illustrating the cantilever reinforcement.
Figure 6:
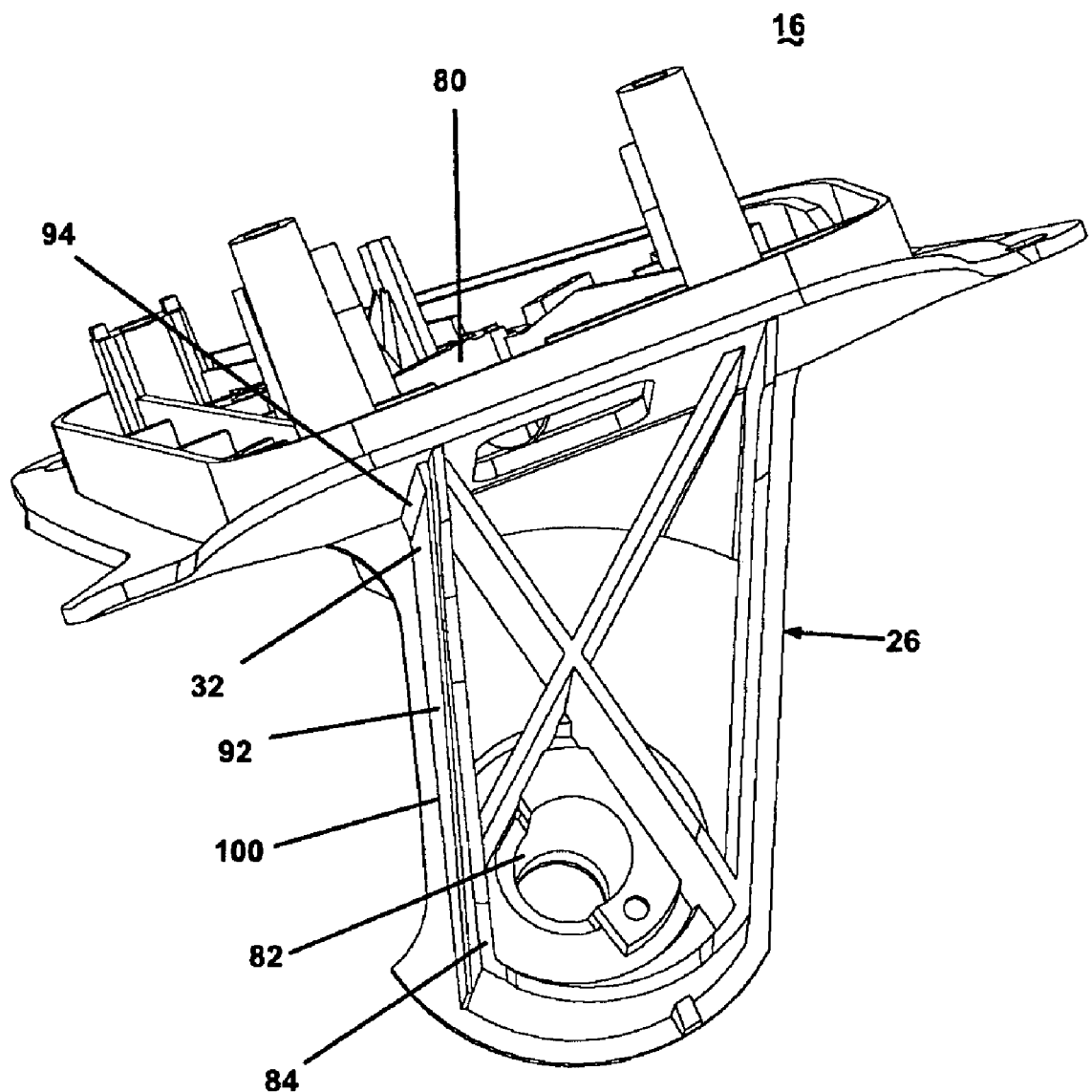
FIG. 6 is a third close up perspective view of the base shown in FIG. 2 illustrating the cantilever reinforcement.
Figure 7A:
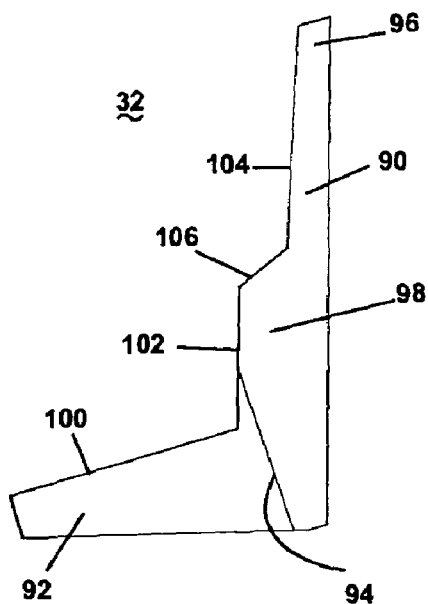
FIGS. 7A-C are close up side and perspective views of the cantilever reinforcement shown in FIG. 2.
Figure 7B:
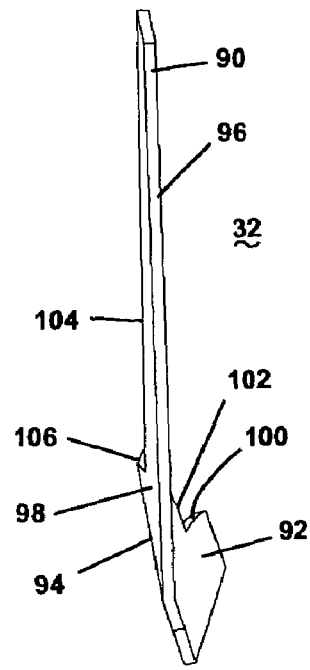
Figure 7C:
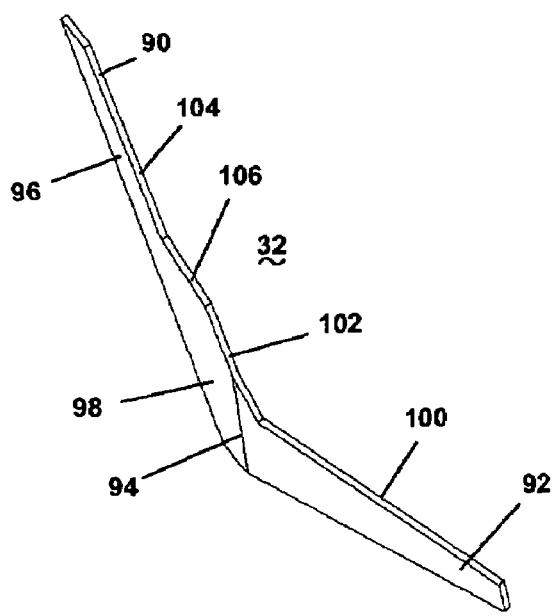

Referring specifically to FIGS. 4-6, the cantilever reinforcement 32 is incorporated into the base 16 so that the mounting frame leg 90 is encased within the mounting frame 80 and the support arm leg 92 extends along the support arm wall 84 in register therewith. As can be seen in FIG. 6, the support arm 26 is inclined relative to the mounting frame 80. The cantilever reinforcement 32 is adapted so that the bend line 94 accommodates the inclination of the support arm 26 relative to the mounting frame 80. The thick section 98 is configured and positioned in the base 16 to accommodate the high bending stresses in the area where the support arm 26 joins the mounting frame 80, which are imposed by the weight of the support frame 18, the reflective element assembly 20, and other attached components, such as a tilt actuator assembly. It will be evident that the cantilever reinforcement 32 can be configured to accommodate a specific size and configuration of the base 16 and the stresses to which the support arm 26 and the mounting frame 80 are subject.

Figure 3:
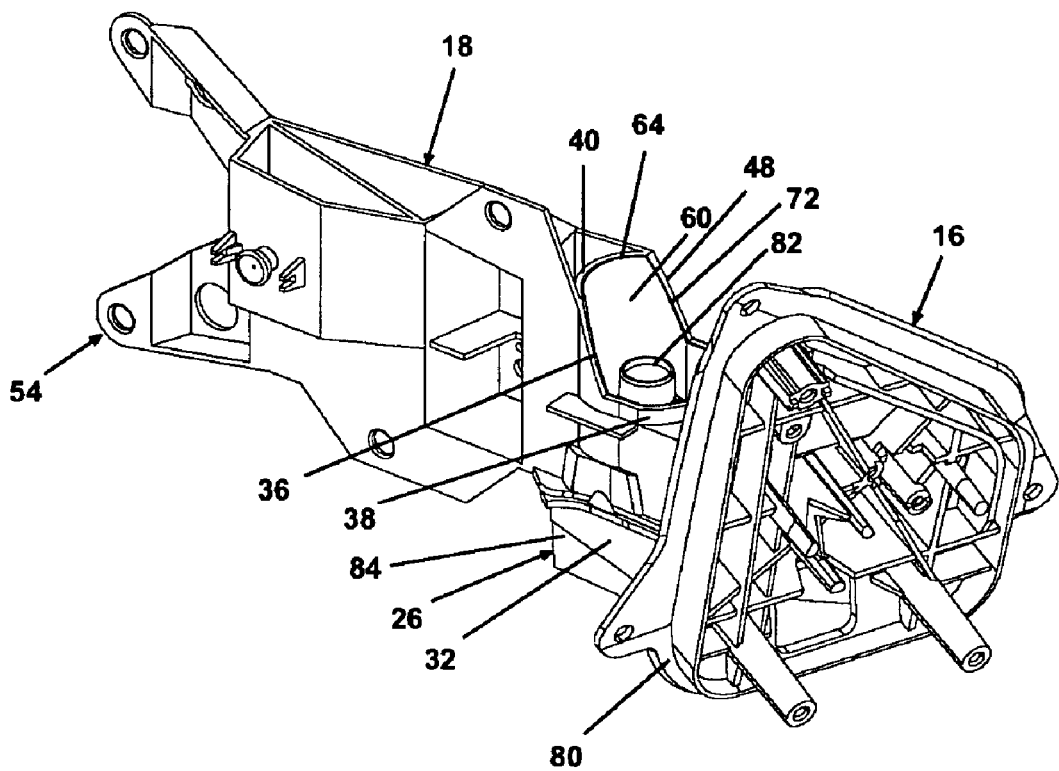
FIG. 3 is a perspective view of the support frame and the base shown in FIG. 2 assembled with the pivot reinforcement and the cantilever reinforcement.
Figure 8:
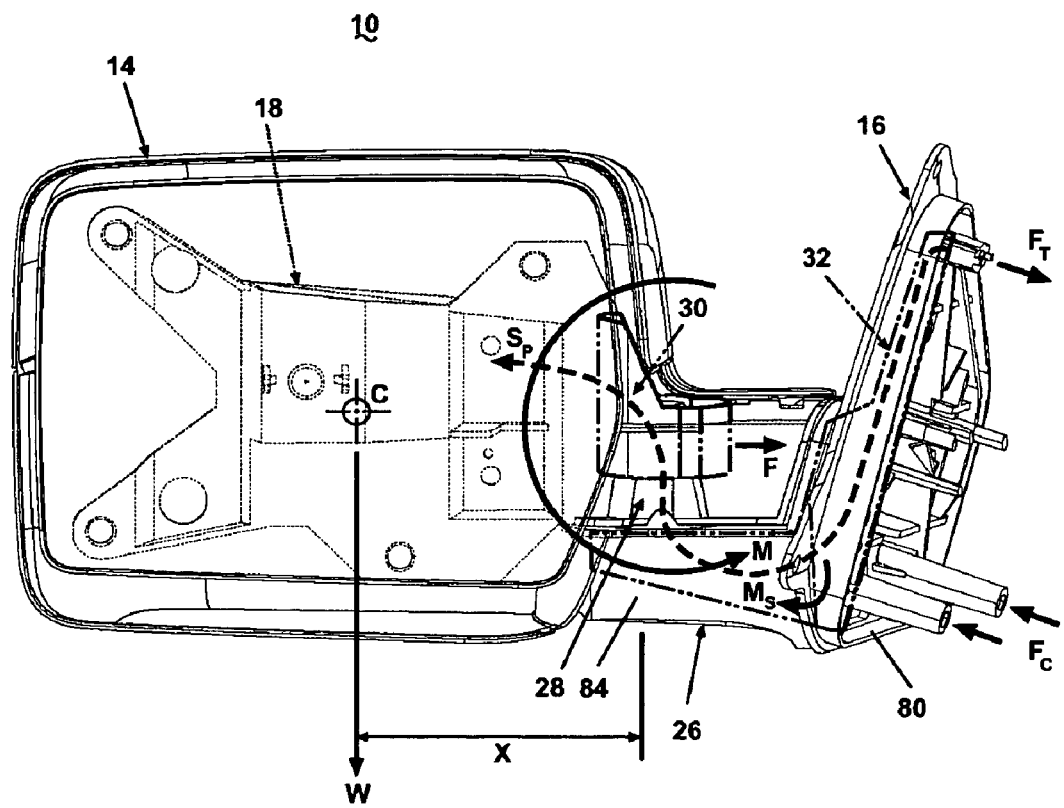
FIG. 8 is a perspective view of the mirror assembly shown in FIG. 1 illustrating various forces and moments acting on the exterior rearview mirror assembly.

As illustrated in FIGS. 2, 3, and 8, the pivot reinforcement 30 is preferably integrally molded into the pivot assembly housing 34 during the fabrication of the pivot assembly housing 34 so that the distal arcuate wall 60 is cooperatively aligned with the distal arcuate wall 36, the proximal arcuate wall 38 is cooperatively aligned with the proximal arcuate wall 62, and the upper rims 64, 66 are cooperatively aligned with the upper rims 40, 42, respectively. Alternatively, the pivot reinforcement 30 can be fixedly attached to the pivot assembly housing 34 in a suitable manner, such as by welding, an interference fit, an adhesive, and the like, to prevent the movement of the pivot reinforcement 30 relative to the pivot assembly housing 34.

FIG. 8 illustrates the various stresses and moments to which the mirror assembly 10, the pivot reinforcement 30, and the cantilever reinforcement 32 are subject. The weight of the mirror housing 14, the base 16, the support frame 18, and the reflective element assembly 20 are represented by a mirror weight W acting downwardly through a center of mass C which defines a moment arm x relative to the pivot assembly 28. The mirror weight W and the moment arm x define a weight moment M acting about the pivot assembly 28. This weight moment M is resisted by a tensile force $F_T$ and a compressive force $F_C$ acting on the base 16. The weight moment M generates an internal resisting moment $M_S$ acting on the cantilever reinforcement 32 and a force F acting on the pivot reinforcement 30. The reinforcing action of the cantilever reinforcement 32 and the pivot reinforcement 30 results in a stress path $S_P$ that travels from the base 16 through the cantilever reinforcement 32 and the pivot reinforcement 30.

The cantilever reinforcement 32 and the pivot reinforcement 30 carry the stress $S_P$ without deformation or the increased probability of material failure that would be present in a pivot assembly and base composed entirely of plastic. The mirror assembly can be fabricated primarily of a plastic material, thereby reducing weight and cost, yet maintaining an adequate load-carrying capacity.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

The invention claimed is:

1. An exterior vehicle mirror system comprising:
   a base having a mounting portion for mounting the mirror system to a vehicle;
   a reflective element assembly for providing an operator of the vehicle with a rearward view;
   a connection pivotally mounting the reflective element assembly to the base; and
   a first reinforcing element associated with the base and vertically spaced from a second reinforcing element associated with the reflective element assembly, the first reinforcing element comprising a surface, in abutment with the base to resist deflection of the base due to forces imposed on the reflective element assembly, the first and second reinforcing elements being integrally molded with the base and the reflective element assembly in cooperative relationship with the connection to distribute at least one of stresses and forces imposed on the vehicle mirror system to the base along a stress path to enhance the strength of the connection.

2. The exterior vehicle mirror system of claim 1, wherein at least one of the first and second reinforcing elements is made of a material having a higher strength-to-weight ratio than the material comprising at least one of the base and the reflective element.

3. The exterior vehicle mirror system of claim 2, wherein the second reinforcing element surrounds at least a portion of the connection.

4. The exterior vehicle mirror system of claim 1, wherein the first reinforcing element comprises a plate having a first end positioned beneath the connection and the second reinforcing element.

5. The exterior vehicle mirror system of claim 4, wherein the first reinforcing element has a second end extending from the first end and in abutment with the mounting portion of the base.

6. The exterior vehicle mirror system of claim 5, wherein the first reinforcing element is L-shaped between the first end and the second end.

7. The exterior vehicle mirror system of claim 6, wherein the L-shape of the first reinforcing element transfers at least one of said forces, said stresses, and moments within the vehicle mirror system from beneath the connection at the first end to the mounting portion adjacent to the second end thereof.

8. The exterior vehicle mirror system of claim 7, wherein the reflective element assembly further comprises a recess which receives the second reinforcing element.

9. The exterior vehicle mirror system of claim 8, wherein the recess has a lower surface which forms a portion of the connection, and the second reinforcing element abuts the lower surface.

10. The exterior vehicle mirror system of claim 9, wherein the recess and the second reinforcing element each comprise a coaxially-aligned recess forming a portion of the connection.

11. The exterior vehicle mirror system of claim 10, wherein the second reinforcing element includes a vertically-extending flange.

12. The exterior vehicle mirror system of claim 11, wherein the vertically extending flange is in alignment with at least one axis of the reflective element assembly.

13. The exterior vehicle mirror system of claim 12, wherein the second reinforcing element further comprises an annular portion surrounding the connection.

14. The exterior vehicle mirror system of claim 13, wherein a portion of the annular portion is integrally formed with the vertically-extending flange, whereby the vertically-extending flange is capable of transferring at least one of said forces, said stresses, and said moments through the connection via the annular portion.

15. The exterior vehicle mirror system of claim 14, wherein at least one of the first and second reinforcing elements is made of metal.

* * * * *